US010152485B2

(12) United States Patent
Sparenberg et al.

(10) Patent No.: US 10,152,485 B2
(45) Date of Patent: Dec. 11, 2018

(54) FILE SYSTEM, COMPUTER AND METHOD

(71) Applicant: Fraunhofer-Gesellschaft zur Foerderung der angewandten Forschung e.V., Munich (DE)

(72) Inventors: Heiko Sparenberg, Nuremberg (DE); Siegfried Floessel, Erlangen (DE); Matthias Martin, Erlangen (DE); Michael Schoeberl, Erlangen (DE)

(73) Assignee: FRAUNHOFE-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 662 days.

(21) Appl. No.: 14/680,246

(22) Filed: Apr. 7, 2015

(65) Prior Publication Data
US 2015/0213044 A1 Jul. 30, 2015

Related U.S. Application Data

(63) Continuation of application No. PCT/EP2012/070296, filed on Oct. 12, 2012.

(51) Int. Cl.
G06F 17/30 (2006.01)

(52) U.S. Cl.
CPC ...... *G06F 17/30106* (2013.01); *G06F 17/301* (2013.01); *G06F 17/3012* (2013.01); *G06F 17/3023* (2013.01); *G06F 17/30115* (2013.01); *G06F 17/30817* (2013.01)

(58) Field of Classification Search
CPC ........... H04N 19/40; H04N 21/234327; H04N 21/235; G06F 17/30289; G06F 17/30905; G06F 17/3028; G06F 3/16; G06F 17/3056; G06F 17/30569
See application file for complete search history.

(56) References Cited

U.S. PATENT DOCUMENTS

| 2003/0187883 | A1* | 10/2003 | Zelenka | G06F 17/30088 |
| 2005/0179567 | A1* | 8/2005 | Apostolopoulos | H04N 21/235 341/50 |
| 2007/0260842 | A1* | 11/2007 | Faibish | G06F 3/061 711/170 |
| 2008/0005468 | A1* | 1/2008 | Faibish | G06F 3/0622 711/114 |
| 2009/0254572 | A1* | 10/2009 | Redlich | G06Q 10/06 |
| 2010/0272187 | A1* | 10/2010 | Civanlar | G11B 27/105 375/240.25 |

OTHER PUBLICATIONS

Official Communication issued in International Patent Application No. PCT/EP2012/070296, dated Jul. 4, 2013.

(Continued)

*Primary Examiner* — Angelica Ruiz
(74) *Attorney, Agent, or Firm* — Keating & Bennett, LLP

(57) ABSTRACT

A file system is configured to provide, based on a request from a requester, a requested file stored on a storage medium to the requester. Furthermore, the file system is configured to provide a chosen part of the requested file corresponding to a desired version of the content of the requested file to the requester, based on received side information in the request indicating the desired version, and based on meta information of the requested file.

33 Claims, 8 Drawing Sheets

(56) References Cited

OTHER PUBLICATIONS

Kang et al., "Harmonic Placement: File System Support for Scalable Streaming of Layer Encoded Object," Proceedings of the 2006 International Workshop on Network and Operating Systems Support for Digital Audio and Video, Nov. 23, 2006, 6 pages.
Per Cederqvist, "CVS—Concurrent Versions System", http://www.web.archive.org/web/20010602100914/http://www.astro.princeton.edu/~rhl/cvs/cvs.html, downloaded Jun. 24, 2013, 70 pages.

* cited by examiner

| name | description | supported by | use case |
|---|---|---|---|
| hres | required horizontal resolution (image width) | JPEG 2000 H.264 SVC | The decoder plays only a small version of the picture or the video, as, for exemple, the display size is limited (e.g. hres=1024) |
| vres | required vertical resolution (image hight) | JPEG 2000 H.264 SVC | The decoder plays only a small version of the picture or video, as the display size is limited (e.g. vres=540) |
| mdr | maximum data rate | JPEG 2000 H.264 SVC MPEG4-SLS | The decoder is not capable of processing data with a higher information content in real time, therefore the file system should only deliver versions with a low data rate (e.g. mdr=2500000000) |
| tgap | skipping of frames (temporal gap) | H.264 SVC | Playback software is in the Fast Forward mode and will only show every nth frame. Hence, the transmission of the complete video is not necessary (e.g. tgap=4) |
| view | reading out certain views | H.264 SVC | The stored file comprises additionally to 2d picture data for a 2-dimensional display, further views, such as a depth card or a further view of a stereoscopic representation (e.g. view=left, view=depth, view=left_right.) |
| Best_effort | file system determines free resources and provides the file in the best version possible in dependence on the determined free resources | JPEG 2000 H.264 SVC MPEG4-SLS | The file server has to cope with too many requests for handling these in real time or the computer with the playback software is fully loaded, a playback in real time is not possible. Hence, the data rate is reduced. |

FIG 3

```
#define FILENAME "C:\\Pictures\JPEG2000\00001.j2c;hres=2048"

int main (int argc, char **argv)
{
   struct stat file_status;
   if (stat (FILENAME, &file_status) != 0) {
      perror ("ERROR: Could not stat or file does not exist");
   }

FILE *fp = fopen (FILENAME, "r");
   char *buffer = NULL;
   buffer = (char *) malloc(file_status.st_size+1);
   if (!fread(buffer, file_status.st_size,1,fp))
   {
      perror ("ERROR: Could not read file");
   }
   buffer[file_status.st_size+1] = '\0';
   printf("%s\n",buffer);
   fclose(fp);
   free(buffer);
   return 0;
}
```

FIG 6

FILE SYSTEM, COMPUTER AND METHOD

CROSS-REFERENCE TO RELATED APPLICATION

This application is a continuation of copending International Application No. PCT/EP2012/070296, filed Oct. 12, 2012, which is incorporated herein by reference in its entirety.

BACKGROUND OF THE INVENTION

Embodiments of the present invention relate to a file system. Further embodiments of the present invention relate to a computer.

During the operation of the computer, data is requested continuously from a mass storage device. Mass storage devices have the advantage that the data stored in these mass storage devices are non-volatile and hence are still available after a restart of the computer. Furthermore, the relative costs per megabyte of a mass storage device are typically significantly lower than the costs for so-called direct access memory (random access memory—RAM). Nevertheless, a disadvantage of such mass storage devices, such as internal and external hard discs or tape drives (tape-libraries) are the higher access times when compared to volatile memories like RAM or cache.

Especially in the field of digital media, files may not be needed in their complete extent. A typical example is that for a preview of a high resolution picture a smaller representation is sufficient. A conventional file system provides the complete file and the program, which shows the preview calculates, based on the received file, a smaller preview file and shows this preview file. Some of these programs store the preview file such that for a repeated access large amounts of data don't have to be requested from the mass storage device again.

The use of so-called scalable files could be a solution. Scalable file formats, such as JPEG 2000 (single frame), H.264 SVC (video) or MPEG4-SLS (audio) are constructed by design, such that they allow a scalability in different dimensions, such as quality (single frame video and audio) or resolution (single frame and video).

Furthermore, if in the future today's available codecs are extended with scalability, the developer of corresponding decoders would have to extend all of these decoders such that upon request different variants of the new format could be provided. This effort would still be reasonable for software, but for hardware it would not be possible to support a new format without exchanging the corresponding hardware elements. As an example, conventional consumer graphic cards have a dedicated hardware which can decode an H.264 video in a given resolution, for example 1920×1080. A decoding of a file with a higher resolution is not possible in real time. But the extension scalable video coding (H.264-SVC) allows furthermore that a lower resolution can be extracted from a file. The result is a standard compliant H.264 file which the chip can decode in real time. Unfortunately, conventional chips available today are not capable of using the scalability, as they don't know about this feature. Hence, the conventional graphic cards are not capable of processing videos in a higher resolution in real time. On the one hand, this graphic card could process a lower resolution, but on the other hand they don't have the knowledge on how to receive the file with the lower resolution. The same applies to conventional software and other scalable formats.

From the perspective of the state-of-the-art mass storage devices, these mass storage devices have no knowledge about the type of file they administer. Hence, there is no difference if the file is a text document or a video.

Hence, the above described problems can be summarized as follows:

It is desired to keep the amount of data which is read from a mass storage device as low as possible, since such a mass storage device is in most cases too slow for delivering the complete files in real time or not necessarily the complete files are needed. But especially real time is in the field of image processing one of the main aspects, as especially during the playback of videos real time is a basic prerequisite for a user. Furthermore, another issue is that hardware and software are typically not upward compatible and have to be replaced if available codecs are extended by the feature of scalability.

SUMMARY

According to an embodiment, a computer may have: a storage medium; an operation system; and a file system, wherein the file system is configured to provide, based on a request from a requester being a requesting application running on the computer, a requested file stored on the storage medium to the requester, wherein the file system is configured to provide a chosen part of the requested file corresponding to a desired version of the content of the requested file to the requester, based on received side information in the request, the received side information indicating the desired version, and based on meta information of the requested file.

According to another embodiment, a storage medium may have a file system, wherein the file system is configured to provide, based on a request from a requester being a requesting application running on the computer, a requested file stored on a storage medium to the requester, wherein the file system is configured to provide a chosen part of the requested file corresponding to a desired version of the content of the requested file to the requester, based on received side information in the request, the received side information indicating the desired version, and based on meta information of the requested file.

According to another embodiment, a method may have the steps of: providing a request for requesting a file stored on a storage medium having stored a file system, the request containing side information, the side information indicating a desired version of the content of the requested file; and receiving the request and providing based on the side information in the request and based on meta information of the requested file a chosen part of the requested file, the chosen part corresponding to the desired version of the content of the requested file.

According to still another embodiment, a method may have the steps of: requesting a desired version of a content of a media file stored on a non-volatile storage medium having stored a file system, the desired version having a desired resolution, quality, color component, region of interest, temporal gap or view information of a plurality of available resolutions, qualities, color components, regions of interest, temporal gaps or view information of the content available in the requested file as stored on the non-volatile storage medium; determining, in dependence on the desired version and meta information of the stored media file, those bits from the stored media file which are associated with the content in the desired version; generating based on the determined bits a new file together with meta information for the new file, the new file having the content in the desired version; and providing the new file together with the meta information for the new file to a requester requesting the desired version of the content of the stored media file.

Another embodiment may have a computer program having a program code for performing, when running on a computer, the above methods.

Embodiments of the present invention relate to a file system which is configured to provide based on a request from a requester a requested file stored on a storage medium to the requester. Furthermore, the file system is configured to provide a chosen part of the requested file corresponding to a desired version of the content of the requested file to the requester, based on received side information in the request, the received side information indicating the desired version, and based on meta information (e.g. a file header) of the requested file.

It is a core idea of embodiments of the present invention that a more efficient handling of files (especially of scalable files) can be achieved if a file system is capable of only providing a chosen part of a requested file, instead of providing the complete file. Hence, the requester can include additional information (the side information) in the request, which indicate which part of the file is requested and the file system can provide this part accordingly instead of providing the complete file from the storage medium to the requester.

It is a further idea of embodiments of the present invention, that a side information in the request can be used to indicate a desired version of the content of the file. Based on the side information and meta information (e.g. stored on the storage medium) of the requested file, the file system itself can determine a chosen part of the requested file which corresponds to the desired version of the content (as requested by the requester). Only this chosen part of the requested file (and not the complete requested file) is provided or transmitted (together with a new header for the chosen part) to the requester. Hence the requester does not need to receive the complete image before it converts the received data to the desired version (e.g. having a desired resolution or quality, color component, region of interest (such as a region in a picture, e.g. top left or bottom right), temporal gap or view information (e.g. left image in a stereoscopic view)) as this is already performed by the file system. Furthermore, the requester even does not need not have a knowledge how it can derive the chosen part of the requested file corresponding to the desired version of the content of the requested file, as the file system has this knowledge and makes use of it by providing the chosen part already corresponding to the desired version. Hence, it is sufficient for the requester to just indicate the desired version of the content of the requested file, wherein the requester does not need to know where, inside the requested file, it can find this desired version of the content of the requested file. Hence, the request can lack an information indicating where to find the desired version of the content in the requested file.

This feature has the advantage that no unnecessary resources are wasted (for example no bandwidth of a mass storage bus connected to the mass storage device is wasted) as the chosen part of the file only is provided to the requester which is needed at the requester and a remaining part of the file which is not needed at the requester is not read from the storage medium and therefore also not transferred or provided via the storage medium bus to the requester. Furthermore, in case of a scalable file (for example a scalable video, audio or picture file), the requester (such as a video, audio or picture decoder) does not need anymore to scale the complete file to the desired resolution or quality, as this scaling can already be done by the file system, which then only provides the chosen part of the requested file which is therefore already scaled to the right resolution or quality. As an example, the side information in the request can define or indicate a desired resolution or quality of the content (such as a desired resolution or quality of an image, a video or an audio stream) of the requested file. The file system can provide this resolution or quality of the content of the requested files by providing the parts of the requested file corresponding to this resolution or quality. Hence, the requester already receives the content of the requested file in the desired resolution or quality and does not need to perform a scaling of the chosen part to derive the content of the requested file in the right resolution or quality.

Furthermore, embodiments even provide a solution if the desired version is not available in the requested file, as in this case the file system provides the chosen part corresponding to another version of the requested file, which is available in the requested file. In this case, the requester may perform a scaling to the desired version on its own. As example, a picture is stored in the resolutions 1920×1080, 960×540, 480×270 and 240×135 on the storage medium. If the requester now requests a version of the picture having a resolution of 720×576 (PAL-resolution), the file system could provide the next higher version (i.e. 960×540) and the requester could perform a scaling from 960×540 pixels to 720×576 pixels.

According to some embodiments of the present invention, the storage medium is a non-volatile storage medium. As an example, the storage medium is a mass storage medium. Such a mass storage medium can be, for example, an internal or external hard disc, a memory stick, a memory card or a CD ROM, a DVD, a Blu-ray or any other storage disc or storage medium for a non-volatile storage of data.

In other words, it is an idea of the embodiments of the present invention to supply the file system during the request of a file with further information (side information) about the later use of a file, such that the file system can deliver or provide the data or file according to the requirements. As an example, for the field of scalable media files, such further information could be, for example, the necessitated horizontal resolution (or in other words, the image width). Hence, a decoding software (which could be the requester) signals during the request for the file which image width (which horizontal resolution) it needs for the displaying of the file. In this case, the decoding software does not need to be capable of reading the scalable data stream from the mass storage medium, as it already receives a version of the file, which corresponds to the desired properties (which already has the desired horizontal resolution).

To summarize: the requester is capable of signaling the file system, the purpose for which the requested file is needed and the file system is configured to provide the requested file accordingly (e.g. in a desired version).

According to further embodiments of the present invention, the file system can be configured to determine based on the meta information those bits of the requested file from the storage medium, which belong to the desired version of the content. Furthermore, only those bits of the requested files are provided to the requester as the chosen part, while the remaining bits of the requested file are not provided to the requester for the current request.

As an example, the meta information can indicate for each version of the content available in the requested file which bits of the requested file belong to the respective version of the content.

Hence, the file system is configured to only access this part of the file which is indicated by the side information in the request, while an access to parts which are not requested by the requester is omitted. Furthermore, only those bits are transmitted to the requester (for example via a storage medium bus) which belong to the desired version of the content, while the remaining bits of the requested file are not transmitted via the storage medium bus to the requester for the current request.

Hence, it can be seen that when compared to systems, in which the complete file is transferred from a storage medium to a requester (via a storage medium bus) although at the requester only a chosen part of the requested file is really needed, a significantly lower data traffic can be achieved without any information losses, as parts of the requested file are not transmitted, which are actually not needed at the requester.

Furthermore, resources at the requester are saved as the requester does not anymore need to scale a received complete file to a desired version (e.g. having a desired quality or resolution).

As an example, the requested file can be scalable without a transcoding of the file. In other words, the file system can be configured to extract the chosen part corresponding to the desired version of the content out of the requested file stored on the storage medium just by choosing the bits belonging to the desired version of the content without the need for transcoding the file, or in other words, without the need for changing the remaining bits of the file to derive the chosen part of the file.

An example for such a file could be a JPEG 2000 file, an H.264-SVC file or an MPEG4-SLS file.

In other words, the file system can be configured to provide the chosen part of the requested file without changing a remaining part of the requested file stored on the storage medium or even without changing any part of the requested files stored on the storage medium. According to further embodiments of the present invention, the file system can comprise scalability information (as part of the meta information) for the requested file which is also stored on the storage medium. The file system can be configured to choose the chosen part of the requested file based on the side information in the request and furthermore based on the scalability information for the requested file. As an example, for a file which is scalable in resolution, the scalability information can comprise for each possible resolution of the content of the requested file an information indicating which part (for example which bits) of the requested file belong to this resolution. Or in other words, different version of the content which are available in the requested file can differ in the resolution of the content. The scalability information (or in general the meta information of the requested file) indicates which bits of the requested file belong to which version (and therefore which resolution) of the content. If now the content of the file stored in the storage medium is requested in a given resolution, the file system can determine based on the scalability information for the requested file the part of the requested file corresponding to this resolution and can provide only this part of the requested file to the requester, without transmitting the not needed parts of the requested file to the requester.

Of course, the scalability information is not limited to resolution, but can also comprise further information for the different possible dimensions of scalability of the content of a file stored on the storage medium.

Furthermore, a scalability information provided for a first file stored on the storage medium can be completely different (can contain different dimensions of scalability) and a scalability information for a second file stored on the storage medium, as an example, the scalability information provided for an audio file could be different to the scalability information provided for a video file or a picture file or even a text file.

Further embodiments of the present invention relate to a computer comprising an above described file system and the storage medium on which the requested file is stored. The storage medium can be an internal storage medium of the computer, but can also be an external storage medium connected to the computer (e.g. via a suitable bus, such as USB Firewire, e-SATA or a network).

As already described, the storage medium can be a non-volatile storage medium of the computer.

It is an advantage of the computing machine or computer comprising one of the above described file systems that a more efficient access to the storage medium of the computer can be achieved in the way that only those parts of a file need to be accessed and transferred to a requester which are really needed by the requester, while parts of the file, which are not needed don't need to be accessed and don't need to be transferred to the requester.

As an example, the computer can comprise a processor and the requester can be a process (such as a software process or a thread) and the processor can be configured to perform the process.

Furthermore, the computer can comprise a volatile working memory and the processor can be configured to transfer the chosen part of the requested file provided by the file system to the volatile working memory. The requester (e.g. the decoding process) can now process the chosen part of the requested file in the volatile working memory. As only the chosen part of the requested file (and not the complete requested file) is transferred to the working memory, resources for the volatile working memory can be saved, when compared to conventional systems, in which the complete requested file is transferred to the volatile working memory in which the requested file is then scaled by a suitable process.

To summarize the above, embodiments of the present invention provide a concept for a parametrical file-request for an optimized data flow using file-inherent scalability on file-system level.

BRIEF DESCRIPTION OF THE FIGURES

Embodiments of the present invention will be described in the following using the accompanying figures in which:

FIG. 3 shows an non-exhaustive table of examples for different parameters which can be indicated in the side information transferred from the requester to the file system as described in conjunction with FIG. 1;

FIG. 6 shows an example for a C routine how it can be performed by the file system shown in FIG. 1;

DETAILED DESCRIPTION OF THE INVENTION

Before embodiments of the present invention will be described in more detail using the accompanying figures, it is to be pointed out that in the figures the same elements or functionally equal elements are provided with the same reference numbers.

Figure 1:
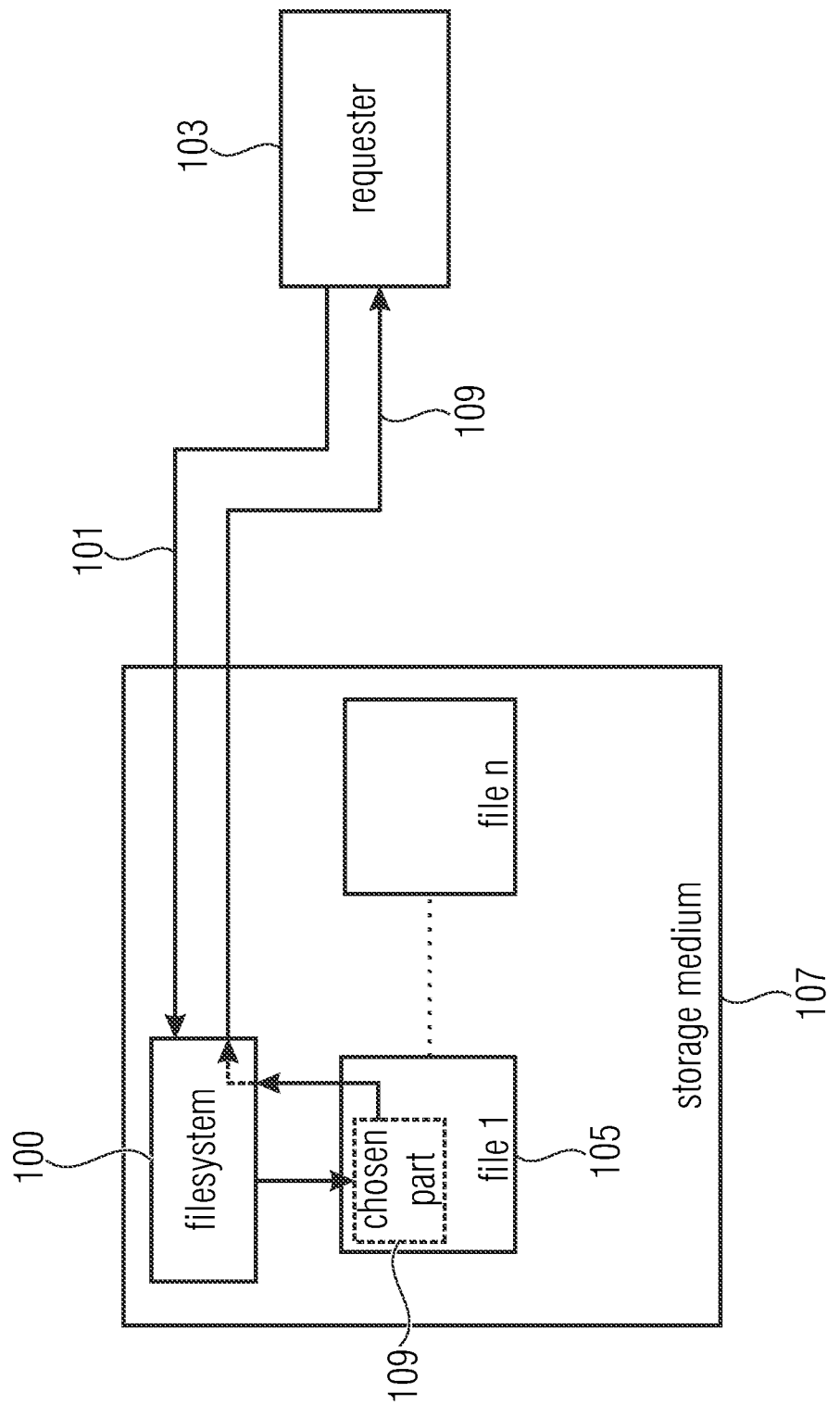
FIG. 1 shows a schematic illustration of a communication between a requester and a file system according to an embodiment of the present invention.

FIG. 1 shows an application example for a file system 100 according to an embodiment of the present invention. The file system 100 is configured to provide based on a request 101 from a requester 103 a requested file 105 stored on a storage medium 107 to the requester 103. Furthermore, the file system 100 is configured to provide a chosen part 109 of the requested file 105 corresponding to a desired version of the content of the requested file 105 to the requester 103 based on received side information in the request, the received side information indicating the desired version, and based on meta information of the requested file 105. As an example, the chosen part 109 is smaller than the complete requested file 105. Furthermore, a new header is generated for the chosen part 109, which is transmitted together with the chosen part to the requester 103.

In other words, and as can be seen from FIG. 1, not the complete requested file 105 is provided to the requester 103, but only the chosen part 109 corresponding to the desired version of the content of the requested file 105 as it was indicated in the received side information in the request 101.

In other words, the requester 103 can indicate inside the side information in the request 101 if it needs the complete file 105 or only a part of the file 105 (such as the chosen part 109) and the file system 100 is capable of providing only this requested chosen part 109 of the file 105, instead of providing the complete file 105. As already described in the introductory part of this application, this enables a more efficient file handling, as not needed parts of the file 105 are not provided and therefore are not transferred to the requester 103 and therefore no resources are wasted. In other words, only the version of the content which is really needed at the requester 103 is provided to the requester 103, while other available versions of the content of the requested file are not provided and therefore not transmitted to the requester 103.

Furthermore, even if the desired version is not available in the requested file 105, the file system 100 can be configured to provide the chosen part 109 corresponding to another version of the requested file 105, which is available in the requested file 105.

As can be seen from FIG. 1, a plurality of different files can be stored in the storage medium 107, which are administered by the file system 100. Furthermore, also the file system 100 can be stored on the same storage medium 107 (as the requested file 105).

The storage medium 107 can be, as already described, a non-volatile storage medium. As an example, this storage medium can be a mass storage medium (such as an internal or external hard disc, a memory stick or memory card, a CD ROM Blu-ray DVD or any other memory disc or storage medium which is capable of a non-volatile storing of files.

Furthermore, the file system 100 can comprise the following additional (optional) features.

The file system 100 can be configured to provide the chosen part 109 of the requested file 105 by reading only those bits of the requested file 105 which belong to the chosen part 109 (and which are indicated by the side information included in the request 101 from the requester 103). Furthermore, the file system 100 provides those bits (belonging to the chosen part 109) to the requester 103. As an example, the chosen part 109 can be provided to the requester 103 through a storage medium bus. By transferring only those bits to the requester 103 through the storage medium bus which belong to the chosen part 109 of the requested file 105 and by skipping those bits of the requested file 105 which do not belong to the chosen part 109 of the requested file 105 no available bandwidth of the storage medium bus is wasted to not needed bits of the requested file 105.

Furthermore, as the file system 100 only provides the chosen part 109 of the requested file 105, the file system 100 generates a new header (so called meta information) for the chosen part 109 of the requested file 105. Such a header can include, for example, a size of the file and information about the performed scaling of the requested file 105 to derive the chosen part 109. For the case of the requested file 105 being a scalable video, image or audio file comprising a plurality of different resolutions or qualities to be extracted out of the requested file 105 without a transcoding of the requested file 105, the header may contain (amongst others) the resolution or quality of the chosen part 109 which has been extracted from the requested file 105. Hence, the file system 100 generates the header for the chosen part 109 of the requested file 105 in dependence on the side information in the request 101 (which, for example, indicates the resolution or quality of the desired version). This feature is also useful in cases in which the requester 103 does not indicate a desired quality or resolution but indicates that the file system 100 shall provide the requested file 105 in the highest quality possible in dependence on free resources in a communication channel between the file system 100 and the requester 103. In this case the requester 103 can gather the resolution or quality of the chosen part 109 provided by the file system 100 from the header generated by the file system 100.

Such a header could include, for example, start addresses or jump in addresses for different versions (e.g. having different resolutions, qualities, color components, regions of interest, temporal gaps or views (e.g. left image in a stereoscopic view)) of the content of the requested file 105 in the chosen part 109. As an example, assuming the case in which the content of the requested file 105 is scalable in various dimensions, or in other words, in which the content of the requested file 105 is available in a plurality of different version which differ by more than one parameter. If now the side information comprises only one parameter (such as a resolution), the file system 100 provides the chosen part 109 such that it comprises all versions of the content associated to this parameter. Hence the chosen part 109 can still comprise a plurality of versions of the content which are associated to this one parameter (e.g. have a desired resolution) but differ in at least a further parameter (such as a temporal gap between two subsequent frames). In this case the header information for the chosen part can indicate the above mentioned jump in addresses for the different versions of the content of the requested file 105 available in the chosen part 109.

Furthermore, the requested file 105 (or the content of the requested file 105) can be scalable without a transcoding of the file. In other words, the file system 100 can be configured to extract the chosen part 109 corresponding to the desired version out of the file 105 without performing a transcoding of the requested file 105. As an example, the file system 100 can be configured to just extract a given number of bits of the requested file 105 belonging to the chosen part 109 and to transfer these bits to the requester 103. Hence, the file system 100 is configured to provide the chosen part 109 of the requested file 105 to the requester 103 without changing neither the chosen part 109 of the requested file 105 nor a remaining part of the requested file 105 stored on the storage medium 107 (which is not provided or transferred to the requester 103). Hence, no encoding or decoding steps need to be performed by the file system 100 to derive the chosen part 109 which is then provided to the requester 103. As an example, such a scalable file could be a scalable video, picture or audio file. Or in general such a scalable file can be based on a scalable (hierarchical) video, picture or audio codec.

Nevertheless, such a scalable file could be also another file, for example, a text file, in which the chosen part of the text file could be a content directory of the text file.

Furthermore, the content of the requested file 105 can be available in a plurality of different versions in the requested file 105. The side information in the request 101 indicates which version is the desired one and should be provided to the requester 103. The file system 100 chooses based on the side information in the request 101 and the meta information of the requested file 105 the part or parts of the requested file corresponding to this desired version of the content and provides this part or these parts as a new file—the chosen part 109—to the requester 103.

Hence, the file system 100 is configured to, for each version of the content available in the requested file 105, determine which bits of the requested file 105 belong to the respective version of the content, without having received this information from the requester 103.

Hence, the file system 100 is configured to, for each version of the content available in the requested file 105, determine which bits of the requested file 105 belong to the respective version of the content, without having received this information from the requester 103. In other words, the request 101 is lacking the information which bits of the requested file 105 belong to the respective version requested in this request 101, as already the file system 100 (or only the file system 100) has this knowledge. Hence, the requester 103 does not need to have a knowledge about the scalability of the requested file 105 as the file system 100 performs the determination of the corresponding bits and the extraction these bits of the requested file 105 on its own (without any information from the requester 103).

Different versions of the content can differ from each other in at least one parameter. As an example the different versions of the content differ from each other in a quality or resolution. Furthermore, at least some of the different versions of the content differ from each other in at least a first parameter and a second parameter. As an example, two different versions of the content can differ on the one hand by the parameter resolution and the other hand by the parameter temporal gap between two subsequent frames.

Furthermore, as already described, the file system 100 comprises meta information (e.g. including scalability information) for the requested file 105, which is also stored on the storage medium 107. The file system 100 is configured to choose the chosen part 109 of the requested file 105 based on the side information provided in the request 101 and based on the meta information for the requested file 105.

As an example, the meta information can comprise for a desired version of the content of the requested file 105 which bits of the requested file 105 belong to this desired version and can provide these bits as the chosen part 109 to the requester 103 upon the reception of a side information indicating the desired version.

Or in other words, the meta information indicate for each version of the content available in the requested file 105 which bits of the requested file 105 belong to the respective version of the content.

Furthermore, bits belonging to one version of the content can also belong to another version of the content available in the requested file 105. As an example, assuming a requested file 105 which is based on a hierarchical video codec including a base layer and a plurality of enhancement layers. Different versions of the content can differ in the number of enhancement layers. Hence, a high quality version of the content contains the enhancement layers of a low quality version and additional enhancement layers (providing more details). Hence, the bits of the low quality version also belong to the high quality version.

Furthermore, the file system 100 can comprise for each stored (scalable) file on the storage medium 107 a scalability information (as part of the meta information of the file). Contents or parameters of the scalability information can differ from file to file and especially between different file types. As an example, parameters stored in scalability information for video files can be different to parameters stored in scalability information for audio files.

Furthermore, the file system 100 is capable of also handling files which are not scalable. For these files, the file system 100 does not need such described scalability information, as there is no scaling possible. As an example, the file system 100 can be configured to provide, based on a further request for a further file which is not scalable, the complete further file to the requester 103 independent on side information in the further request. In other words, the file system 100 is configured to, if it receives a request for a non-scalable file, provide or transfer this file as the complete file to the requester 103.

Furthermore, the file system 100 can be configured to, if the request 101 does not comprise side information or does not comprise valid side information provides the complete requested file 105 to the requester 103. By having this function, the highest possible compatibility can be ensured, as even a requester can request the file 105 which is not capable of defining side information in the request 101 (as an example, due to an old software or hardware).

Furthermore, the file system 100 can be configured to, if the side information indicates a desired version of the content which is not available in the requested file 105, provide the chosen part 109 corresponding to another version of the content of the requested file 105 which is available in the requested file 105. Hence, the file system 100 does not necessarily provide the complete requested file 105 if the desired version of the content is not available but another version. As an example, a resolution or quality of the other version of the content can be chosen lower than a resolution or quality of the desired version of the content. With this mechanism, the requester 103 can, with a high probability, process the chosen part 109 provided to the requester 103, as it can be assumed that, if the requester 103 requests the content in a high resolution or quality it should be also capable of processing the content in a lower resolution or quality.

Another example, a region of interest of the other version of the content can be chosen larger than a (desired) region of interest of the desired version of the content. This is useful at it seems to be better provide the requester 103 with a larger region of interest of the content as with a too small one.

Figure 2:
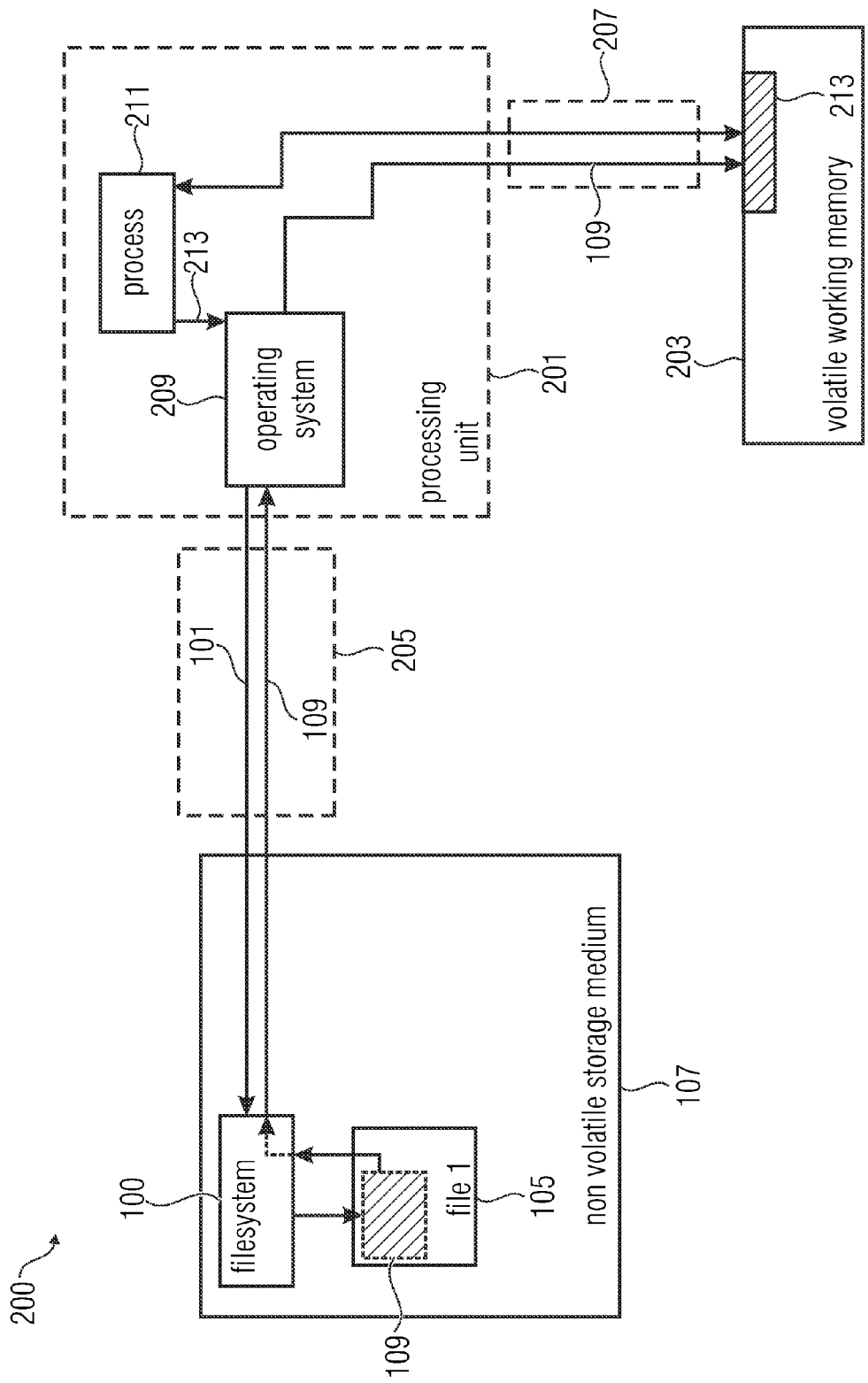
FIG. 2 shows a computer according to an embodiment of the present invention comprising a file system, such as the file system described in conjunction with FIG. 1.

FIG. 2 shows a block schematic diagram of a computer 200 according to an embodiment of the present invention.

The computer 200 includes the file system 100 shown in FIG. 1. Furthermore, the computer 200 comprises a non-volatile storage medium 107 on which the file system 100 and the files 105 are stored. Furthermore, the computer 200 comprises a processing unit or processor 201 and a volatile working memory 203 (such as a RAM or cache).

The processing unit 201 is configured to provide the request 101 to the file system 100 and is further configured to receive the chosen part 109 of the requested file 105. Furthermore, as can be seen from FIG. 2, the processing unit 201 is configured to transfer the chosen part 109 of the requested file 105 received from the file system 100 to the volatile working memory 203. The processing unit 201 is connected to the non-volatile storage medium 107 having stored thereon the file system 100 by a storage medium bus 205 (which is a bidirectional bus). Hence, both the request 101 and the chosen part 109 are transferred (as bits) through this storage medium bus 205. Furthermore, the processing unit 201 is connected to the volatile working memory 203 by a data bus 207. A maximum available data rate in the data bus 207 is typically much larger than a maximum available data rate in the storage medium bus 205. The file system 100 provides the chosen part 109 of the requested file 105 at the storage medium bus 205 to the processing unit 201.

Furthermore, as can be seen from FIG. 2, the computer 200 can comprise an operating system 209 which is performed on the processing unit 201 and a process of program 211 which is further performed on the processing unit 201. In the example shown in FIG. 2, the process 211 needs to access the chosen part 109 of the requested file 105 and therefore sends a request command 213 to the operating system 209. The operating system 209 provides upon receipt of this request command 213 the request 101 to the file system 100 including side information indicating the chosen part 109 of requested file 105. The file system 100 provides the chosen part 109 of the requested file 105 to the operating system 209 and the operating system 209 reserves a certain memory area 213 in the volatile working memory 203 for the process 211 into which the chosen part 109 of the requested file 105 is transferred. The process 211 can now access the chosen part 109 of the requested file 105 in the volatile working memory 203.

According to further embodiments of the present invention, the process 211 may directly send its request command 213 as the request 101 to the file system 100.

As an example, such process 211 could be a decoding process (such as a video, audio or picture decoding process).

Hence, the processing unit 201 can be understood as the requester 103 shown in FIG. 1.

Furthermore, the processing unit 201 can be a processor (such as a single core processor in which the operating system 209 and the process 211 run on the same core) or a multi-core processor (in which the operating system 209 and the process 211 run on the same core or on different cores).

The way how the side information is transferred to the file system 100 can be implemented in different ways. One of these ways is to add further parameters to the real file names, such as; "C:\\Pictures\JPEG2000\00001.j2c", which indicate parameters based on which the file system 100 determines the part (the chosen part 109) of the requested file 105 to be transmitted to the requester 103 (or to the processing unit 201).

As an example, a minimum necessitated in image width could be transferred to the file system 100 with the following command: "C:\\Pictures\JPEG2000\00001.j2c; hres=1024" wherein hres=1024, indicates a maximum horizontal resolution of 1024 pixels for a scalable video file or picture file.

Further to the image width also further parameters could be implemented or indicated in the side information. FIG. 3 shows examples for such parameters indicated in the side information of the request 101.

One of such parameters could be a necessitated horizontal resolution (or an image width) which could be used if a decoder (such as the process 211) plays only a small version of the picture of the video, as for example, the display size is limited (e.g. for an image width of 1024 pixels, a value of this parameter could be hres=1024).

Another parameter could be the necessitated vertical resolution (or the image height). This parameter can be used if the decoder (for example the process 211) plays only a small version of the picture or video, as the display size is limited (e.g. for an image height of 540 pixels, a value of the parameter could be vres=540). The parameters necessitated horizontal resolution and necessitated vertical resolution are supported, for example, by the JPEG2000 standard and the H.264 SVC standard.

A further parameter could be a maximum data rate, this parameter can be used if the decoder (for example the process 211 or the complete processing unit 201) is not capable of processing data with a higher information content in real time, therefore the file system 100 should only deliver versions with a low data rate. This parameter is supported, for example, by the JPEG 2000, the H.264 SVC and the MPEG4-SLS standard.

A further parameter could indicate a skipping of frames (e.g. a temporal gap) of a video file stored on the storage medium 107. This could be used, for example, as the playback software (such as the process 211) is in the fast forward mode and will only show every n-th frame. Hence, the transmission of the complete video file is not necessary (an example for a value of such parameter could be for the transmission of every fifth frame, tgap=4). This parameter is supported, for example, by the H.264 SVC standard.

A further parameter could be that only certain views are read out of a stored video file. This parameter could be used, if the stored video file comprised additionally to the picture data for two-dimensional display, further views, such as a depth card or a further view of a stereoscopic representation. Examples for values of these parameters are view=left, view=depth, view=left right. This parameter is supported, for example, by the H.264 SVC standard.

A further parameter could be a best effort parameter in which the file system 100 determines free resources and provides the stored file 105 in the best version possible in dependence on the determined free resources. In other words, the file system 100 is configured to determine free resources (for example on the storage medium bus 205) and provides the requested file 105 in the best version possible for the available resources. This parameter could be used, for example, when a file server (on which the file system 100 runs) has to cope with too many requests for handling these in real time or the computer with the playback software (the computer 200 with the processing unit 201) is fully loaded and a playback in real time is not possible. Hence, the data rate can be reduced by the file system 100. This parameter is supported, for example, by the JPEG 2000, the H.264 SVC and the MPEG4-SLS standard.

The parameters shown in FIG. 3 are only an example of exemplary parameters which could be implemented in the side information of the request 101. Furthermore, also other parameters could be implemented in the side information, hence, the table shown in FIG. 3 is not exhaustive.

Furthermore, combinations of the parameters shown in the table could be included in the side information (such as C:\\Pictures\\JPEG2000\\00001.j2c; hres=1024; tgap=4).

It is only important that during requesting a file stored on the storage medium 107, side information is transmitted to the file system 100, indicating in which version the content of the requested file 105 is needed and that the file system 100 delivers the requested file 105 according to the parameters defined in the side information. Hence, a decoding unit (such as the processing unit 201) does not need anymore to find the correct version in the scalable file format, as this task is already performed by the file system 100. Hence, the processing unit 201 (or in general the requester 103) receives the already scaled version of the requested file 105 (for example the chosen part 109 of the requested file 105) and does not need to perform any scaling steps anymore. As already described, the requested file 105 can be scalable without a transcoding, hence, no change of the format of the requested file 105 stored on the storage medium 107 is to be performed by the file system 100 to determine the chosen part 109 of the requested file 105. In other words, there is no need for a transcoder in the file system 100 which, for example, is capable of transforming an H.264 SVC video in a JPEG 2000 frame sequence. Hence, embodiments of the present invention utilize the scalability of formats, which support the feature that a chosen part 109 of a scalable file 105 can be extracted out of the scalable file 105 without a transcoding step. For a parametrical request of files which are stored in a non-scalable file format, the additional parameters in the side information are ignored by the file system 100 and the file system 100 delivers the non-scalable file in the only available version.

To summarize, according to some embodiments of the present invention the side information comprises at least one of the following parameters: necessitated horizontal resolution, necessitated vertical resolution, maximum data rate, temporal gap between two frames of a video file to be provided (frames to be skipped of the video file), view (of a plurality of views) of the video file to be provided and a parameter or flag indicating that the file system shall provide the best quality possible in dependence on the available resources.

Nevertheless, the side information can comprise further parameters not listed above in dependence on the scalability of the file 105 stored on the storage medium 107.

Figure 4:
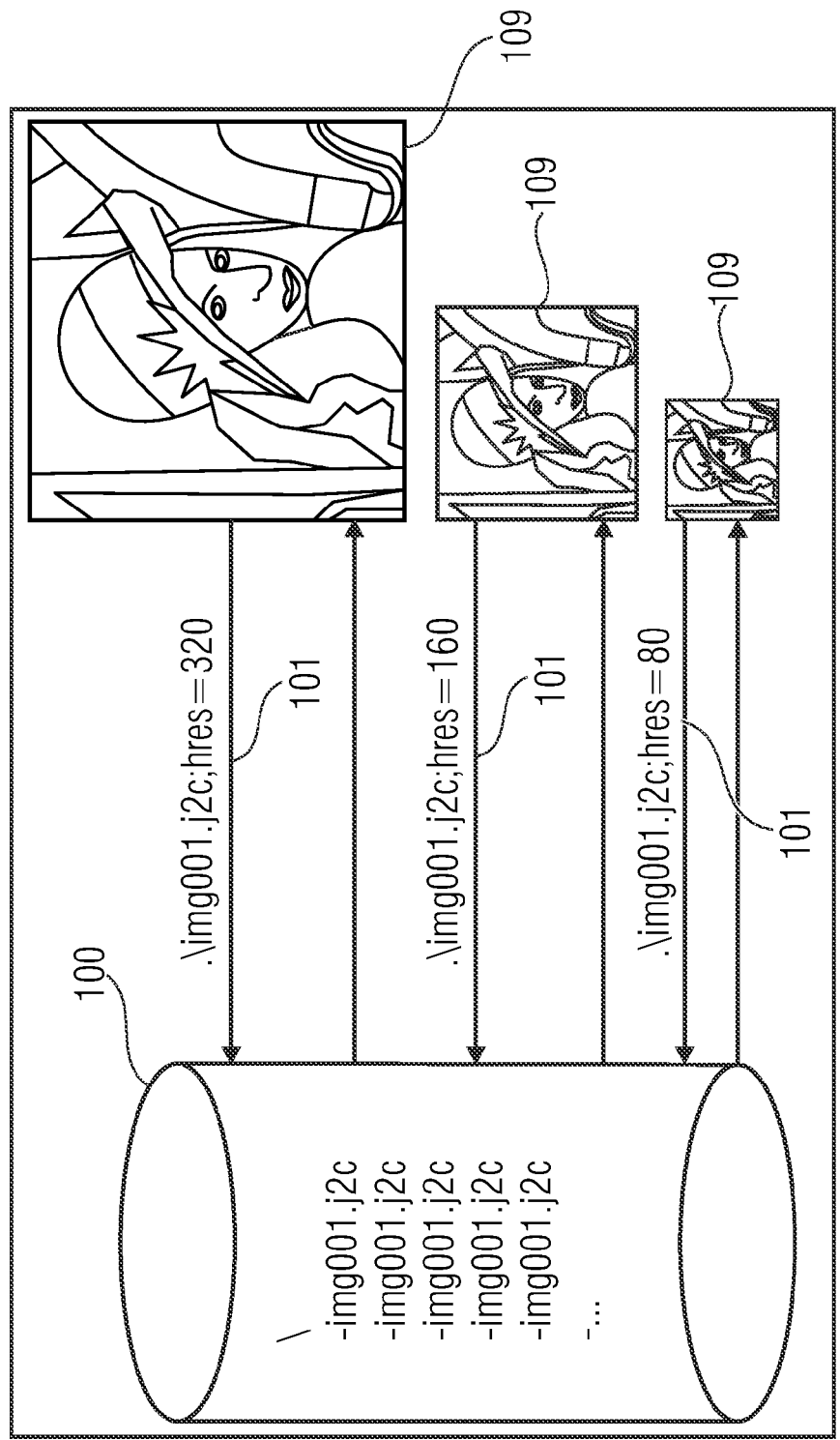
FIG. 4 shows the result of different file requests according to embodiments of the present invention.

FIG. 4 shows different results in response to requests 101 for a file 105 (having the file name IMG001.j2c) with different parameters in the side information for the horizontal resolution. It can be seen that the file system 100 provides the requested file 105 in the right horizontal resolution (in form of the chosen part 109 of the requested file 105).

Hence, the decoder processing the chosen part 109 of the requested file 105 does not have anymore to perform a scaling of the requested file 105 to the desired horizontal resolution (e.g. horizontal resolution=320 or 160 or 80) as this is already performed by the file system 100. Hence, the decoder or requester 103 requesting the requested file 105 does not need to have knowledge about the scalability of the requested file 105. It just requests the file 105 in the format it needs for further processing.

Furthermore, the file system 100 is capable of handling cases in which a scaling as requested by the requester 103 can't be performed or, in other words, cases in which a desired version of the content of the requested file 105 is not available in the requested file 105. As an example, a JPEG 2000 file with a maximum resolution of 1920×1080 of its video content, comprises its video content also in the resolutions 960×540, 480×270, 240×135 etc. Hence, the maximum available resolution is divided by 2. The number of available resolutions in the requested file 105 can vary and is determined during the generation of the JPEG 2000 file. If now the requesting process (the requester 103) requests the content in a version having a horizontal resolution of 1280 (hres=1280) which is not available in the requested file 105, the file system 100 delivers the version of the content having the next higher resolution (in this case 1920×1080) since the next lower resolution (960×560) would be too low. According to further embodiments, the file system 100 could also deliver the next lower resolution version (e.g. to prevent that the requester 103 is not capable of handling the next higher resolution version). According to further embodiments, the file system 100 could also deliver both, the next lower resolution version and the next higher resolution version and the requester 103 could determine on its own which one of the version it uses (in scalable codecs the lower resolution version is typically contained in the higher resolution version).

For the next higher resolution version, the requester 103 can perform the scaling to the requested resolution (1280×) on its own. From the above it can be seen that the file system 100 delivers only these versions of the content (being differently scaled) which are available in the requested file 105. Hence, no scaling or transcoding is performed by the file system 100 (e.g. to derive the 1280× version out of the 1920× version).

Figure 5:
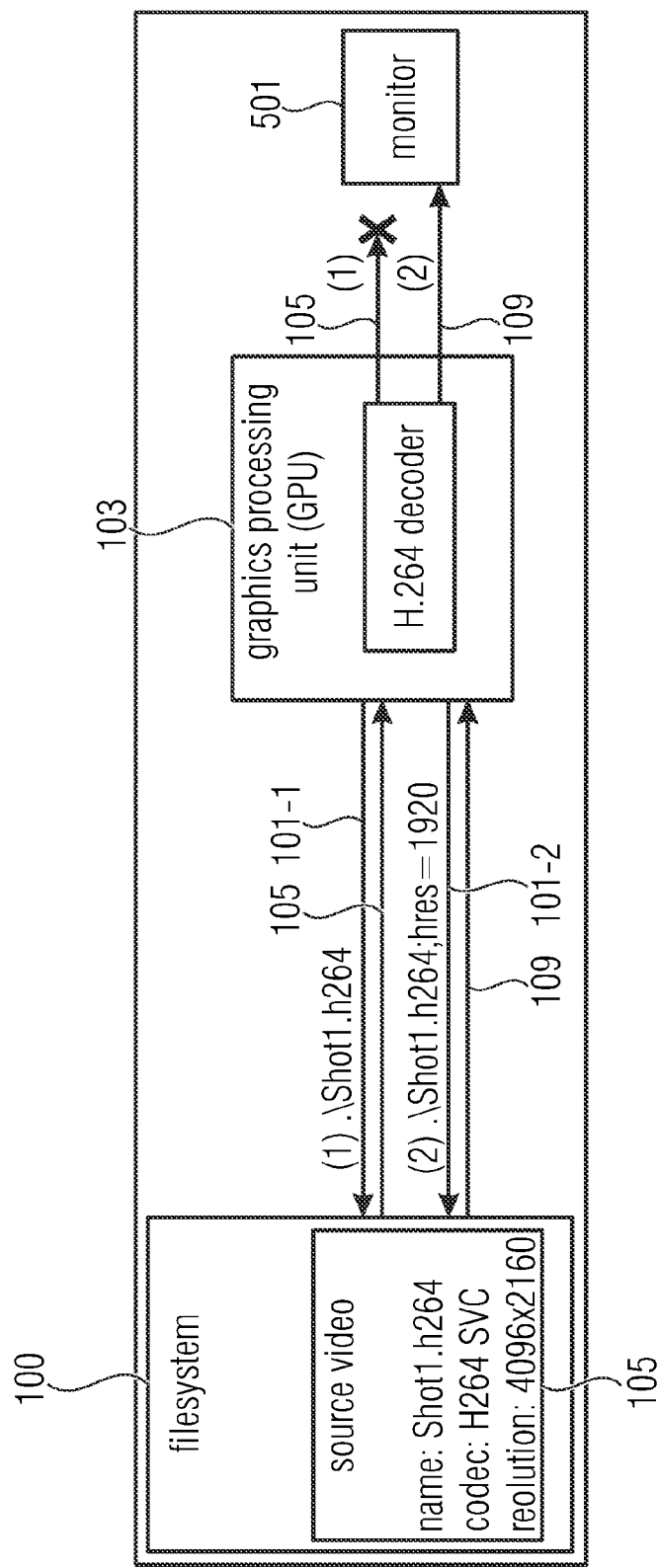
FIG. 5 shows an example how a backward compatibility can be achieved by using a file system according to an embodiment of the present invention.

FIG. 5 shows an application example of the parameter transmission for the file requests as performed by embodiments of the present invention.

For a first request (1) 101-1 with no side information included in the request 101-1 the real time decoder of the graphics processing unit (which is the requester 103) is not capable of decoding the complete video file 105 received from the file system 101 in real time as it is not capable of handling the large resolution (4096×2160 Pixel—4K resolution) video file stored on the storage medium. Furthermore, the graphics processing unit 103 (e.g. an H.264 decoder of the graphics processing unit 103) is not capable of scaling the video file 105 from the original 4K resolution down to the 2K resolution needed by a monitor 501. Hence, the graphics processing unit 103 is not capable of displaying the complete video file 105 on the monitor.

If now, according to an embodiment of the present invention, additional side information (such as a maximum horizontal resolution of 1920 pixels) is included in a second request (2) 101-2, the file system 101 delivers only the chosen part 109 of the requested file 105 (having a 2K resolution) which can be decoded by the graphic's processing unit 103 in real time and can be displayed on the monitor 501. Hence, from FIG. 5 it can be seen that embodiments of the present invention enable even a decoder or a graphic's processing unit 103 which is not capable of handling video files in a large resolution (such as 4 k video files) to only request the video files in resolution they can handle and therefore enable the graphics processing unit 103 to display even such large resolution video files without an additional scaling of the video files performed by the graphics processing unit 103.

FIG. 6 shows a typical example for a file request in the programming language C (wherein for the sake of clarity, include instructions and an error handling is omitted).

At the beginning, the file name is posted with the instruction #define FILENAME "C:\\Pictures\\JPEG2000\\00001.j2c; hres=2048". Already at this stage, the parametrical file request is used. It can be seen that the later available image width should be 2048 (2 k) pixels. In the example shown in FIG. 6, the real requested file 105 has a native resolution of 4096×2160 (4 k) pixels and a size of about 8 MB. A function call of the function fstat without any additional parameters would provide the respective file size of 8 MB.

The following function call provides the size of the image file, which it would have in the 2 k resolution (2048×1080):

```
If (stat (FILENAME, &file_status) !=0)
{
    perror ("ERROR: Could not stat or file does not exist");
}
```

In the following lines memory is allocated for the image (such as the memory area 213 in the volatile working memory 203) and the image data is copied to the local memory of the process 211. It has to be ensured that for further function calls to the file system 100 parameters in the side information are not varied, as otherwise the previously delivered files are not consistent anymore.

As an example, an erroneous transmission of image data would occur if during the call of
FILE *fp=fopen (FILENAME, "r");
other (or no) additional parameters would be transmitted since in this case another (larger) version of the file would be provided by the file system 100. The use of different parameters for the horizontal resolution was already shown in FIG. 4.

In the following some aspects of embodiments of the present invention shall be summarized.

By transmitting additional parameters (the side information) during a file request to the file system 100 an intended purpose for the file can be communicated to the file system 100. The file system 100 uses this additional side information, for providing scalable files in a version which is appropriate for the desired use case to the requesting application. The task of scaling a stored file on a storage medium can be transferred to the file system. Hence, an upward compatibility for hardware and software can be achieved, which would be otherwise only probable using software updates and/or by replacing hardware. Furthermore, a logic for providing different representations or versions of the scalable file has to be only implemented once in the central file system 100, instead of integrating such algorithms in the plurality of different software and hardware decoders, accessing the stored files.

Another significant advantage of the proposed implementation by adding further parameters to a file name is transparency as it can be achieved that:
A backup of a directory would provide the full file without any restrictions;
a program which does not support the additional side information still receives the complete file, which enables an backward compatibility;
the transmission of parameters can happen automatically through mountpoints without the need for adapting layers in between; and
the file system 100 can reply possible parameters and versions by showing new hidden files with the respective parameter appendix.

Furthermore, the file system 100 can be configured to determine in dependence on current user rights if a chosen combination of parameters is allowed for the current user. Even for a negative outcome of such a check of user access rights, no error handling is necessary, as a file with a respectively lower content (such as resolution or quality) can be provided to the user having not sufficient user rights for requesting the file in another version.

The above described concept of the parameter transfer to the file system 100 is just one exemplary implementation for providing the file system 100 with the intended purpose of the requested files. Another exemplary implementation would be to copy the side information in not viewable fields instead of adding the side information at the end of the file name. Such not viewable fields could be read from the file system and could be interpreted. Nevertheless, even for this implementation, a file is requested from the file system 100 which then provides the requested part 109 of file 105 according to the transferred side information (or additional parameters) in a version which is optimized for the desired use case.

Furthermore, other types of scalability exist, a scalability of which can be used in embodiments of the present invention. As an example, during the request of a text document, only the content directory is needed as the end application (for example the requester 103) only wants to show this part of the text document. Hence, embodiments of the present invention are not limited to scalable media files, but can also be used in conjunction with not scalable files, such as not media files.

Embodiments of the present invention can be used in different fields of application, such as file storage, file systems, image processing, such as transcoding, continuous archiving of photo material or image material, file management for scalable video picture or audio files and content distribution.

Figure 7:
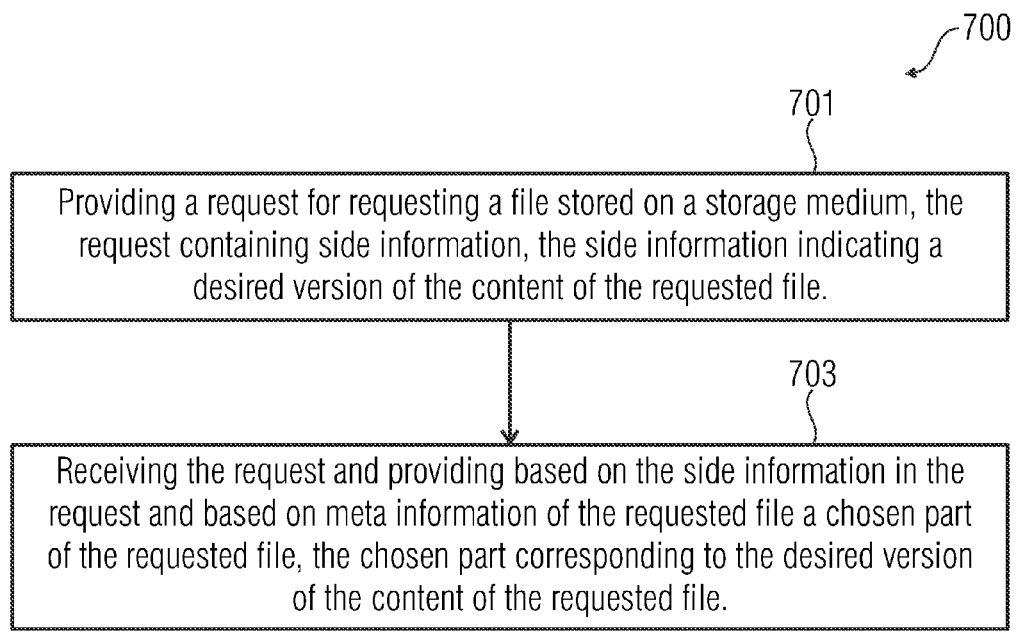
FIG. 7 shows a flow diagram of a method according to an embodiment of the present invention.

FIG. 7 shows a flow diagram of a method according to an embodiment of the present invention.

The method 700 comprises a step 701 of providing a request for requesting a file stored on a storage medium, the request containing side information, the side information indicating a desired version of the content of the requested file. As an example, the storage medium can be a non-volatile storage medium.

Furthermore, the method 700 comprises a step 703 of receiving the request and providing based on the received side information in the request and based on meta information of the requested file a chosen or certain part of the requested file, the chosen or certain part corresponding to the desired version of the content of the requested file.

The method 700 can be performed by an embodiment of the present invention, for example, by the requester 103 and the file system 100 (or in general by the computer 200 shown in FIG. 2).

Figure 8:
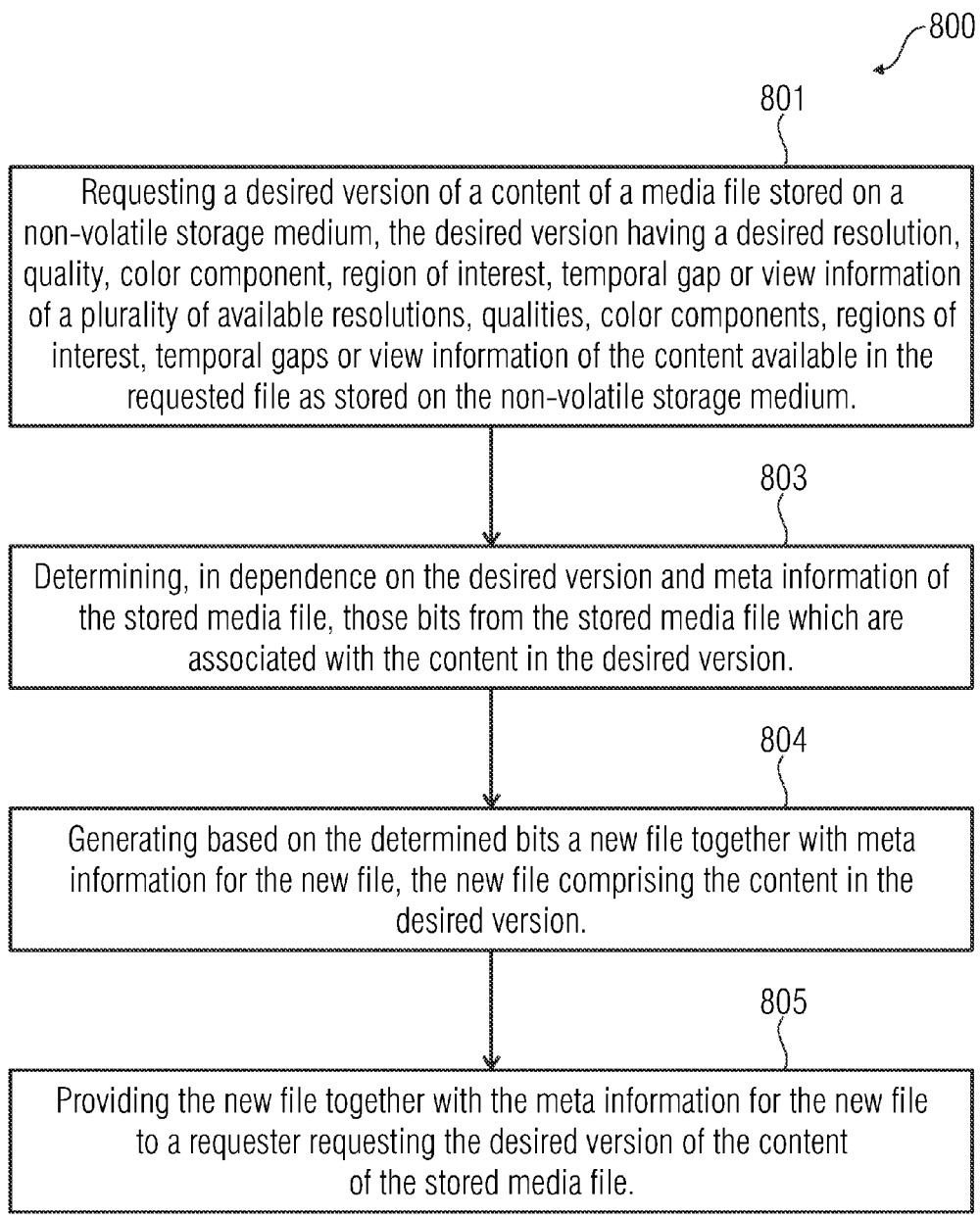
FIG. 8 shows a flow diagram of a method according to a further embodiment of the present invention.

Furthermore, FIG. 8 shows a further method 800 according to a further embodiment of the present invention. The method 800 can be performed, for example, by the computer 200.

The method 800 comprises a step 801 of requesting a desired version of a content of a media file 105 stored on a non-volatile storage medium 107, the desired version having a desired resolution, quality, color component, region of interest, temporal gap (between two frames of a video to be displayed) or view information of a plurality of available resolutions, qualities, color components, regions of interest, temporal gaps or view information of the content available in the requested file 105 as stored on the non-volatile storage medium 107.

Furthermore, the method 800 comprises a step 803 of determining, in dependence on the desired version and meta information of the stored media file 105, those bits from the stored media file 105 which are associated with the content in the desired version.

Furthermore, the method 800 comprises a step 804 of generating, based on the determined bits, a new file 109 (the chosen part 109) together with meta information for the new file 109, the new file 109 comprising the content in the desired version.

Furthermore, the method 800 comprises a step 805 of providing the new file 109 together with the meta information for the new file 109 to a requester 103 requesting the desired or at least an almost desired version of the content of the stored media file 105.

As an example, the processing unit 201 of the computer 200 can perform the step 801 of requesting the media file in the desired resolution or quality and the file system 100 of the computer 200 can perform the steps 803 to 805.

Furthermore, if the side information indicates a desired version of the content which is not available in the stored media file 105, the new file 109 is provided corresponding to another version of the content of the stored media file 105 (e.g. having a higher resolution as the desired version) which is available in the stored media file 105.

In this case during step 803 those bits from the stored media file 105 are determined which are associated with the content in the other version. Furthermore in step 804 the new file 109 (the chosen part 109) is generated, based on the determined bits, together with meta information for the new file 109, the new file 109 comprising the content in the other version.

The other version can be chosen, such that the desired version can be extracted out of the other version (by the requester 103).

To summarize the above, the meta information for the new virtual file (the chosen part 109) is generated according to the version of the content of the requested file 105 in the chosen part 109. The generation of the virtual file is abstract for the requesting process (the requester 103). Hence, the requesting process does not need information about the structure of the scalable requested file 105 as stored on the storage medium 107, as the file system performs the task of extracting the desired version of the content out of the requested file 105.

As an example, the media file could be an audio file, a picture file or a video file.

To summarize, embodiments of the present invention provide a concept for a parametrical file request for optimizing the data flow by using scalability on file system level.

It has been found by the inventors that mass storage devices typically provide files without any knowledge about the intended purpose of the files. This concept is reasonable for non-scalable file types wherein the checking of user and access rights is sufficient. It has further been found by the inventors that for scalable media files, such as media files in the progressive picture compression format JPEG 2000, the knowledge about the intended purpose of the file can be used to only provide the parts of the file, which are really needed by the application requesting the file, such that not used information is not transmitted to the requester. This is achieved by embodiments of the present invention by providing the file system additionally to the request for the file itself providing with information about the intended use of the file. In this application, a method for a parametrical file request including an example implementation has been described. This implementation enables the use of the scalability of scalable files for a further optimization of the complete processing chain in the file system. This enables especially for old hardware and software components a certain degree of upward compatibility.

The methods 700, 800 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A computer comprising:
a storage medium;
an operation system; and
a file system,
wherein the file system is configured to provide, based on a request from a requester being a requesting application running on the computer, a requested file stored on the storage medium to the requester;
wherein the file system is configured to provide a chosen part of the requested file corresponding to a desired version of the content of the requested file to the requester, based on received side information in the request, the received side information indicating the desired version, and based on meta information of the requested file;
wherein the file system is configured, to provide to the requester as a new virtual file, the chosen part of the requested file together with new meta information for the chosen part;
wherein the file system is configured to generate the new meta information for the chosen part which is different from the meta information of the requested file such that the requester is able to determine a resolution or a quality of the chosen part provided by the file system from the new meta information generated by the file system.

2. The computer according to claim 1,
wherein the storage medium is a non-volatile storage medium.

3. The computer according to claim 1,
wherein the file system is configured to provide the chosen part of the requested file by determining, based on the meta information, those bits of the requested file belonging to the desired version and by providing only those bits of the requested file in response to the request to the requester as the chosen part.

4. The computer according to claim 1,
wherein the chosen part corresponding to the desired version can be extracted from the requested file without a transcoding of the requested file.

5. The computer according to claim 1,
wherein the content of the requested file is available in a plurality of different versions in the requested file.

6. The computer according to claim 5,
wherein the different versions of the content differ from each other in a quality, resolution, color component, region of interest, temporal gap or view information.

7. The computer according to claim 5,
wherein at least some of the different versions of the content differ from each other in at least a first and a second parameter.

8. The computer according to claim 5,
wherein the file system is configured to, for each version of the content available in the requested file, determine which bits of the requested file belong to the respective version of the content, without having received this information from the requester.

9. The computer according to claim 1,
wherein file system is configured to generate the meta information for the chosen part in dependence on the desired version of the content of the requested file to which the chosen part corresponds to.

10. The computer according to claim 9,
wherein the file system is configured to generate the meta information for the chosen part such that it comprises a parameter indicating a quality, resolution, color component, region of interest, temporal gap or view information of the desired version.

11. The computer according to claim 1,
wherein the file system is configured to provide the chosen part of the requested file without changing a remaining part of the requested file stored on the storage medium.

12. The computer according to claim 1,
wherein the requested file stored on the storage medium is a video, picture or audio file which is based on a scalable hierarchical video, picture or audio codec.

13. The computer according to claim 1,
wherein the file system is configured to, if the request does not comprise side information or does not comprise valid side information, provide the complete requested file to the requester.

14. The computer according to claim 1,
wherein the file system is configured to, if the side information indicates a desired version of the content which is not available in the requested file, provide the chosen part corresponding to another version of the content of the requested file which is available in the requested file.

15. The computer according claim 14,
wherein a resolution or quality of the other version of the content is higher or lower than a resolution or quality of the desired version of the content; or
wherein a region of interest of the other version of the content is larger or smaller than a region of interest of the desired version of the content.

16. The computer according to claim 1,
wherein the file system is configured to provide based on a further request for a further file stored on the storage medium, the content of the further file being available in only one version, the complete further file to the requester independent of side information in the further request.

17. The computer according to claim 1,
wherein the side information comprises at least one of the following parameters indicating the desired version of the content: necessitated horizontal resolution, necessitated vertical resolution, maximum data rate, temporal gap between two frames of the content of the requested file to be provided, a view of the of the content of the requested file to be provided, a maximum response time until the requested file is to be delivered to the requester, a color component of the content of the requested file to be provided, a region of interest of the content of the requested file to be provided and a parameter or flag indicating that the file system shall provide the requested file in the best quality possible in dependence on the available resources; and
wherein the file system is configured to provide the chosen part based on the parameter or parameters comprised in the side information and based on the available version or versions of the content within the requested file.

18. The computer according to claim 1,
wherein the meta information of the requested file is stored together with the requested file on the storage medium.

19. The computer according to claim 1, wherein the file system and the requested file are stored on the storage medium.

20. The computer according to claim 1,
wherein the storage medium is a non-volatile storage medium.

21. The computer according to claim 1,
further comprising a processing unit configured to provide the request to the file system and to receive the chosen part of the requested file.

22. The computer according to claim 21,
wherein the processing unit is connected to the storage medium by a storage medium bus at which the file system provides the chosen part of the requested file.

23. The computer according to claim 21, further comprising:
a volatile working memory;
wherein the processing unit is configured to transfer the chosen part of the requested file provided by the file system to the volatile working memory.

24. The computer according to claim 23, further comprising:
a program code for a process which can be performed on the processing unit and which is configured to access the chosen part of the requested file in the volatile working memory.

25. The computer according to claim 24,
wherein the process is an image, audio or video decoding process.

26. The computer according to claim 24,
wherein the program code of the process and the requested file are stored on the same storage medium of the computer.

27. A storage medium comprising a file system,
wherein the file system is configured to provide, based on a request from a requester being a requesting application running on the computer, a requested file stored on a storage medium to the requester;
wherein the file system is configured to provide a chosen part of the requested file corresponding to a desired version of the content of the requested file to the requester, based on received side information in the request, the received side information indicating the desired version, and based on meta information of the requested file;
wherein the file system is configured, to provide to the requester as a new virtual file, the chosen part of the requested file together with new meta information for the chosen part;
wherein the file system is configured to generate the new meta information for the chosen part which is different from the meta information of the requested file such that the requester is able to determine a resolution or a quality of the chosen part provided by the file system from the new meta information generated by the file system.

28. The storage medium according to claim 27,
wherein the storage medium is a non-volatile storage medium.

29. A method comprising:
providing a request for requesting a file stored on a storage medium having stored a file system, the request comprising side information, the side information indicating a desired version of the content of the requested file; and
receiving the request and providing based on the side information in the request and based on meta information of the requested file a chosen part of the requested file, the chosen part corresponding to the desired version of the content of the requested file;
wherein the file system provides to the requester, as a new virtual file, the chosen part of the requested file together with new meta information for the chosen part;
wherein the file system is configured to generate the new meta information for the chosen part which is different from the meta information of the requested file such that the requester is able to determine a resolution or a quality of the chosen part provided by the file system from the new meta information generated by the file system.

30. A method comprising:
requesting a desired version of a content of a media file stored on a non-volatile storage medium having stored a file system, the desired version comprising a desired resolution, quality, color component, region of interest, temporal gap or view information of a plurality of available resolutions, qualities, color components, regions of interest, temporal gaps or view information of the content available in the requested file as stored on the non-volatile storage medium;
determining, in dependence on the desired version and meta information of the stored media file, those bits from the stored media file which are associated with the content in the desired version;
generating based on the determined bits a new file together with meta information for the new file, the new file comprising the content in the desired version; and
providing the new file together with the meta information for the new file to a requester requesting the desired version of the content of the stored media file;
wherein the file system provides to the requester, as a new virtual file, the chosen part of the requested file together with new meta information for the chosen part;
wherein the file system is configured to generate the new meta information for the chosen part which is different from the meta information of the requested file such that the requester is able to determine a resolution or a quality of the chosen part provided by the file system from the new meta information generated by the file system.

31. The method according to claim 30, wherein, if the side information indicates a desired version of the content which is not available in the stored media file, the new file is provided corresponding to another version of the content of the stored media file which is available in the stored media file.

32. A non-transitory computer readable medium including a computer program comprising a program code for performing, when running on a computer, a method according to claim 29.

33. A non-transitory computer readable medium including a computer program comprising a program code for performing, when running on a computer, a method according to claim 30.

* * * * *